United States Patent [19]

Jones et al.

[11] Patent Number: 4,668,060
[45] Date of Patent: May 26, 1987

[54] AUDIO-VISUAL SHOW TOY

[75] Inventors: Lawrence T. Jones, Los Angeles; Paul J. Ishikawa, Hermosa Beach; Ashley G. Howden, Los Angeles, all of Calif.

[73] Assignee: California R&D Center, Culver City, Calif.

[21] Appl. No.: 827,820

[22] Filed: Feb. 7, 1986

[51] Int. Cl.⁴ .............................................. G03B 31/06
[52] U.S. Cl. ....................................... 353/15; 353/18; 353/109; 353/DIG. 2; 353/103
[58] Field of Search .................................... 353/15–19, 353/71, 103, 105, 106, 114, 116, 117, DIG. 2, 120, 109; 352/179, 187, 126, 31, 34

[56] References Cited

U.S. PATENT DOCUMENTS

| 3,702,721 | 11/1972 | Skuja | 353/19 |
| 3,801,199 | 4/1974 | Kaye | 353/120 X |
| 4,027,958 | 6/1977 | Shigeta et al. | 353/15 R |
| 4,092,063 | 5/1978 | Koester | 353/71 |
| 4,165,159 | 8/1979 | Landau et al. | 353/15 |

FOREIGN PATENT DOCUMENTS 32421 10/1964 Fed. Rep. of Germany ...... 353/114

Primary Examiner—Harry N. Haroian
Attorney, Agent, or Firm—Price, Gess & Ubell

[57] ABSTRACT

An improved audio-visual toy is provided by a housing assembly configured to simulate a portable television set. A magnetic deck assembly reads the signals on a magnetic tape element to produce an audio transmission that describes a story. Concurrently, the signals tell the user when to activate a pneumatic system that houses a clutch and ratchet system to advance a film element for producing a sequence of projected images that also describe the story.

9 Claims, 8 Drawing Figures

AUDIO-VISUAL SHOW TOY

BACKGROUND OF THE INVENTION

1. Field of the Invention

The present invention generally relates to toys that provide audio or visual entertainment and, more particularly, to an improved audio-visual toy that projects visual images and concurrently produces an audio transmission, and also enables the user to activate the toy a distance remote therefrom.

2. Brief Description of the Prior Art

During the past decades, artisans in the toy field have developed toys that produce visual images and simulate to varying extents a motion picture movie. One early toy includes a binocular device into which is inserted a cardboard carousel containing a series of pictures on a photographic film element. The user activates a mechanism in the device to rotate the carousel and thereby pass the individual images into the viewing area while holding the device up to a light source.

A subsequently developed toy more closely simulates moving pictures, but again does so without an audio transmission. A film element having a series of images on it is housed in a cartridge element for insertion into a housing of the toy. The user manually turns a crank mechanism to move the film in the cartridge and thereby projects a series of images. The user has the option of projecting the images onto a viewing screen in the toy or onto a viewing surface apart from the toy.

In another toy, images can similarly be projected either onto a viewing screen or onto a viewing surface. However, an audio transmission is produced by utilizing a conventional phonograph record system. A film element containing a series of images is placed in a straight cardboard strip. As the phonograph record is played, a mechanism allows the strip to be slowly dropped in front of a light source. Consequently, the audio transmission complements the visual images projected. While this device provides an improvement over the prior toys, shortcomings exist.

As with all phonograph record systems, the quality of the audio transmission produced is dependent in part upon the absence of vibration or movement of the record system. A toy that includes a phonograph record system on the external portion of the toy is particularly susceptible to abuse and poor audio transmission when used by children. In addition, since movement of the photographic film strip is dependent upon the phonograph record system properly working, disturbance of the record system disturbs the projection of visual images.

SUMMARY OF THE INVENTION

One object of the present invention is to provide an improved audio-visual toy that produces a sequence of visual images to describe a story concurrently with an audio transmission that also describes the story.

Another object of the present invention is to provide an audio transmission that remains substantially free from vibration or movement of the invention.

In addition, an object of the present invention is to enable the user to activate the projection of images at a distance remote from the housing assembly of the present invention.

The preferred embodiment of the present invention accomplishes these objects by providing, among other things, a housing assembly which is configured to simulate a television. A photographic film assembly contains a film element having a sequence of images that describe a story and moves continuously through a cartridge element for uninterrupted viewing. A pneumatic system and ratchet and clutch system drive the photographic film assembly while a magnetic deck assembly reads the signals from a magnetic tape assembly for producing an audio transmission.

These and other objects of the present invention will be evident from examining the drawings, specification, and claims attached hereto.

DETAILED DESCRIPTION OF THE PREFERRED EMBODIMENT

The following description is provided to enable any person skilled in the electrical and mechanical toy fields to make and use the present invention and sets forth the best modes contemplated by the inventor of carrying out his invention. Various modifications, however, will remain readily apparent to those skilled in the art, since the generic principles of the present invention have been defined herein specifically to provide an improved audio-visual movie toy.

Figure 1:
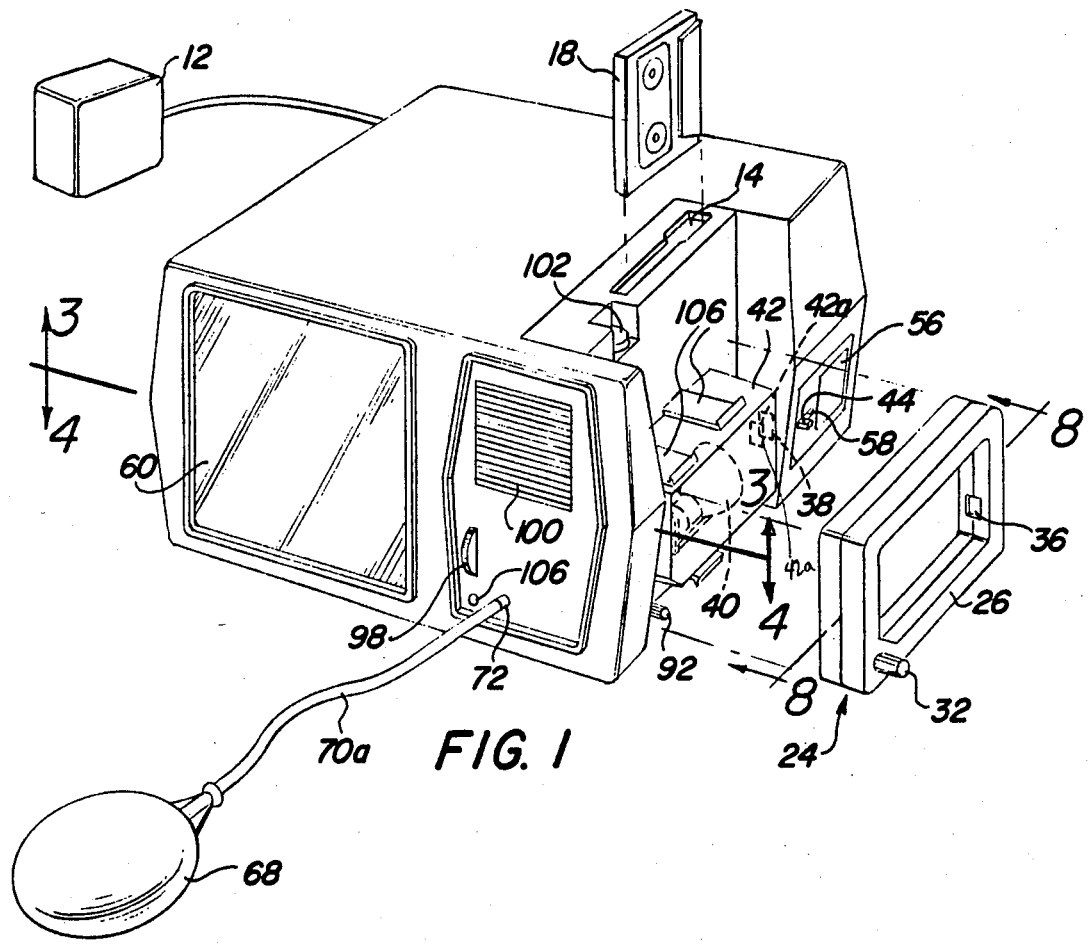
FIG. 1 is a perspective view of a preferred embodiment of the present invention.
Figure 2:
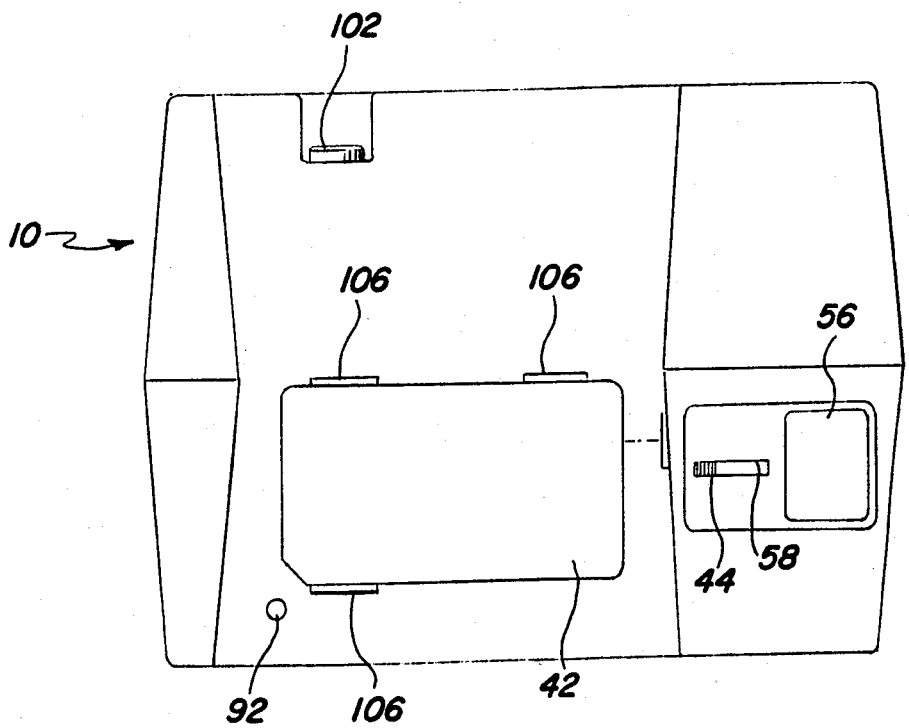
FIG. 2 is an elevated, side view of the present invention.

In FIG. 1, a housing assembly 10 is provided in which various elements of the present invention are supported and housed. The housing assembly 10 is preferably made of a hard plastic material and generally rectangular in shape and has a front, back, top, bottom, right side and left side facings that simulate the size and appearance of a portable television set. An external power source 12 powers the audio elements of the present invention, further described below, and preferably converts a 120 volt a.c. into a 9 volt d.c.

The power source 12 drives a magnetic deck assembly 20 that is controlled by the components on a printed circuit board 104. The magnetic deck assembly 20 is of any conventional design for an assembly commonly known as a portable cassette tape deck and is rigidly fixed within the upper portion of the housing assembly 10 and disposed adjacent a tape cartridge inlet 14 formed in the top facing of the housing assembly 10. The cartridge inlet 14 is generally rectangular in shape with one end thereof having a width greater than the width of the opposite end, and is particularly of a size and configuration to receive a magnetic tape assembly described below. An inlet cover (not shown) serves to shield the magnetic deck assembly 20 from dirt and other foreign particles that might enter it from the cartridge inlet 14 and is a generally flat, rectangular shaped element preferably made of plastic and hinged on the interior side of the top facing of the housing assembly 10 adjacent to the inlet 14. The inlet cover is conventionally hinged to the housing assembly 10 by a pair of spring elements (not shown) to maintain the cover in a position that covers inlet 14 during the time that the deck assembly 20 is not in use.

The deck assembly 20 and cartridge inlet 14 are designed to receive a magnetic tape assembly having a magnetic tape element 16 movable through a first cartridge element 18, both of which are combined in a conventional design and commonly referred to as a cassette tape. Upon its insertion through the inlet 14 and past the inlet cover, the magnetic tape assembly becomes engaged in the magnetic deck assembly 20, upon which the deck assembly 20 reads the magnetic tape element 16. The magnetic tape element 16 contains a plurality of magnetic signals that preferably describe a story by means of words and/or song. Whether words and/or song signals are contained on the tape element 16, the signals on the tape element 16 serve to complement the projection of visual images further described below. In addition, the tape element 16 preferably contains signals, whether by words or otherwise, that indicate to the reader when the next visual image in sequence should be viewed, the purpose of which is described later. The transmission can be discontinued and the tape assembly removed from the deck assembly 20 upon activation of an ejection element 102 in the top facing near the right side facing of the housing assembly 10.

Figure 3:
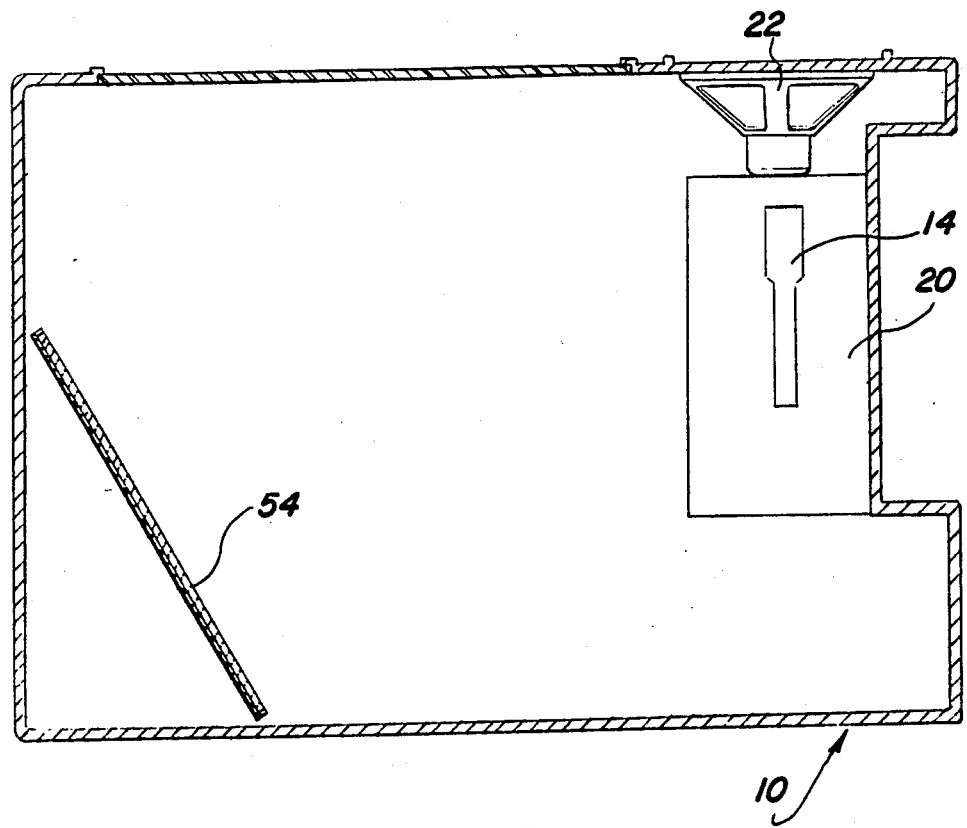
FIG. 3 is a sectional view taken about line 3—3 of FIG. 1.

Upon the deck assembly 20 reading the signals from the tape element 16, the deck transmits the signals to a speaker 22 of any appropriate conventional speaker design to enable the user to hear the signals (FIG. 3). The speaker 22 is preferably round and cone shaped, the circumference being approximately one-half the height of the front facing of the housing assembly 10 and rigidly fixed to the interior surface of the front facing adjacent a speaker screen 100 formed in the front facing. The speaker screen 100 is configured in the shape of a grating to allow the signal from the speaker 22 to be projected out of the housing assembly 10 to the user. Alternatively, the user can take a conventionally designed earphone plug and insert it into an earphone jack 108 disposed in the front facing of the housing assembly 10 disposed near a volume knob 98. The jack 108 picks up the transmission signal from the deck assembly 20 for listening by the user. In either event, the loudness of the signal through the earphone plug or the speaker 22 is controlled by the volume knob 98 which is conventionally connected to the printed circuit board 104 and partially extends out of the front facing of the housing assembly 10 as shown in FIG. 1.

Figure 8:
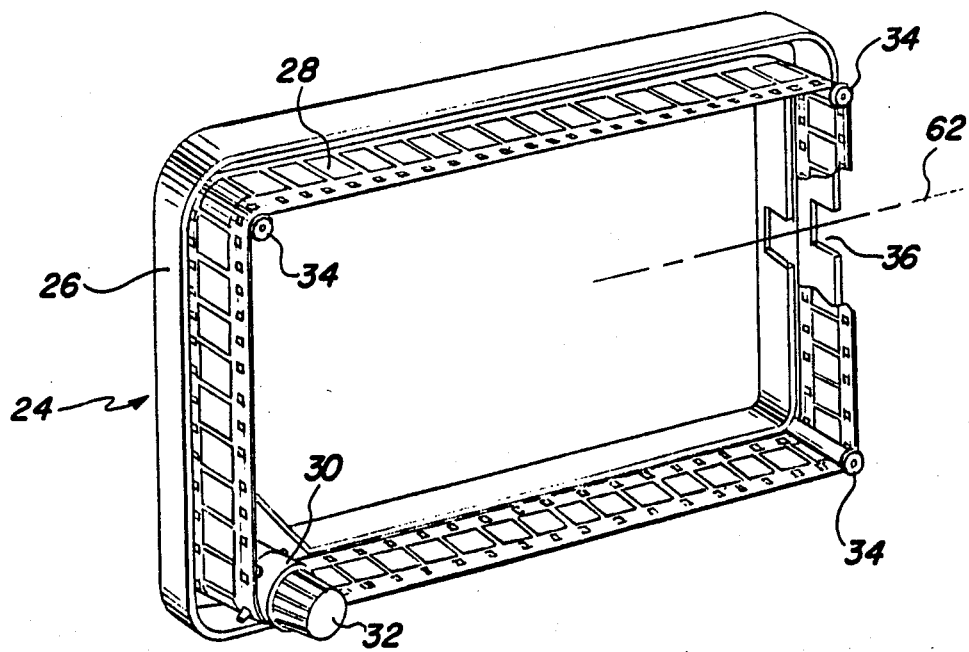
FIG. 8 is an enlarged, perspective view of the film assembly while disassembled.

Referring to FIGS. 1 and 8, a photographic film assembly 24 is provided for producing visual images concurrently while the user listens to the audio transmission being produced by the magnetic tape assembly. In FIG. 8, the film assembly 24 includes a second cartridge element 26 shaped like by two concentric rectangles which thereby provide a cavity therein for a photographic film element 28 disposed in a looped path through the entire length of the cavity. The photographic film element 28 is of a conventional design, similar to that utilized in motion pictures without a soundtrack, and contains a plurality of images in a sequence. As the film element 28 moves in the continuous loop through the second cartridge element 26 and images are thereby sequentially projected, as described below, the images preferably tell the same story as that in the audio transmission.

The film element 28 moves around the cavity of the second cartridge element 26 by the aid of three cylindrical shaped film rollers 35 as the film element 28 is being driven by a drive sprocket 30 having two separable portions 30a, 30b. The drive sprocket 30 is disposed within the second cartridge element 26 at the lower corner nearest the front facing of the housing assembly 10, as viewed in FIG. 1, and is preferably a plastic, elongated, rod shaped element whose longitudinal length is approximately equal to the width of the film element 28. The drive sprocket 30 includes a bore that extends along approximately its entire longitudinal length and has alternating teeth and notches therein for engagement to a clutch shaft 92 described below. On the exterior surface of the drive sprocket 30 at each end thereof is a set of five teeth equidistantly spaced about the sprocket's longitudinal axis. Stationarily fixed at the end of the drive sprocket 30 that is opposite the end engaged to the clutch shaft 92 is a sprocket knob 32 which extends outside of the second cartridge element 26 and is a cylindrical shaped element whose exterior surface has alternating grooves and ridges that extend parallel to its longitudinal axis for providing a surface to be held by the user.

As the drive sprocket 30 is rotated about its longitudinal axis either by the clutch shaft 92 or the sprocket knob 32 in the manner described below, the sets of five teeth on the drive sprocket 30 sequentially engage the apertures on the edges of the film element 28 and cause each image on the film element 28 to sequentially move past a square shaped film aperture 36 formed by the second cartridge element 26 at the side thereof which is opposite the front facing of the housing assembly 10, as viewed in FIGS. 1 and 8.

The photographic film assembly 24 is readily engaged and disengaged to the toy for operation by sliding the drive sprocket 30 over the clutch shaft 92 as in FIG. 1. At the same time, the second cartridge element 26 is frictionally engaged to three holder elements 106 extending outwardly from the right side facing of the housing assembly 10 near the clutch shaft 92. Each holder element 106 is generally a flat, rectangular shaped element with a flanged edge that engages the inside edge of the second cartridge element 26. The film assembly 24 is readily disengaged from the clutch shaft 92 and the holder elements 106 upon the user applying pressure to the holder elements 106 in a direction opposite their flanged edges and then sliding the drive sprocket 30 away from the clutch shaft 92.

When the photographic film assembly 24 is engaged to the clutch shaft 92 and the holder elements 106, the film aperture 36 is opposite an image aperture 38 formed in the right side facing of the housing assembly 10 and through which the images on the film element 28 are projected (FIG. 1). Also at that time, the second cartridge element 26 encircles a light source that includes a reflector element 40 for directing a light beam from a standard light bulb held therein (not shown), both of which are housed in a bulb housing 42. The reflector element 40 is generally cone shaped and preferably made of a metallic, light reflective element. At its apex is a bulb contact (not shown) of any appropriate conventional design to provide an electrical current from the power source 12 to the light bulb held to such contact. The reflector element 40 is stationarily fixed to a recessed portion of the right side facing of the housing assembly 10 so that the apex of the cone shaped portion of the reflector is positioned closest to the front facing of the housing assembly 10, the open end is nearest the back facing of the housing assembly 10, and thereby enables the light bulb to produce a light beam which has a primary optical axis 62 positioned generally parallel to the right side of the housing assembly 10. In addition, the reflector element 40 is positioned so that the optical axis 62 will pass generally through or near the film aperture 36 and image aperture 38.

The bulb housing 42 is generally a rectangular shaped box element with one of the two larger sides thereof being omitted to enable the housing 42 to be placed over the reflector element 40 and remain frictionally engaged on the right side facing of the housing assembly 10. The size of the bulb housing 42 is slightly smaller than the rectangular shaped inside edge of the second cartridge element 26, is of a length slightly larger than the longitudinal length of the reflector element 40, and is of a height and depth slightly larger than the circumference of the largest part of the cone shaped portion of the reflector element 40. The bulb housing 42 is preferably made of the same material as the housing assembly 10 and is coated on the inside thereof with a black pigmented element for assisting the light beam along the optical axis 62. At the side of the bulb housing 42 immediately opposite the open end of the cone portion of the reflector element 40 is an aperture 42a of approximately the same size as the film aperture 36 and the image aperture 38, and is positioned generally along or near the optical axis 62 to enable the light beam from the light bulb to pass to the image aperture 38.

Figure 4:
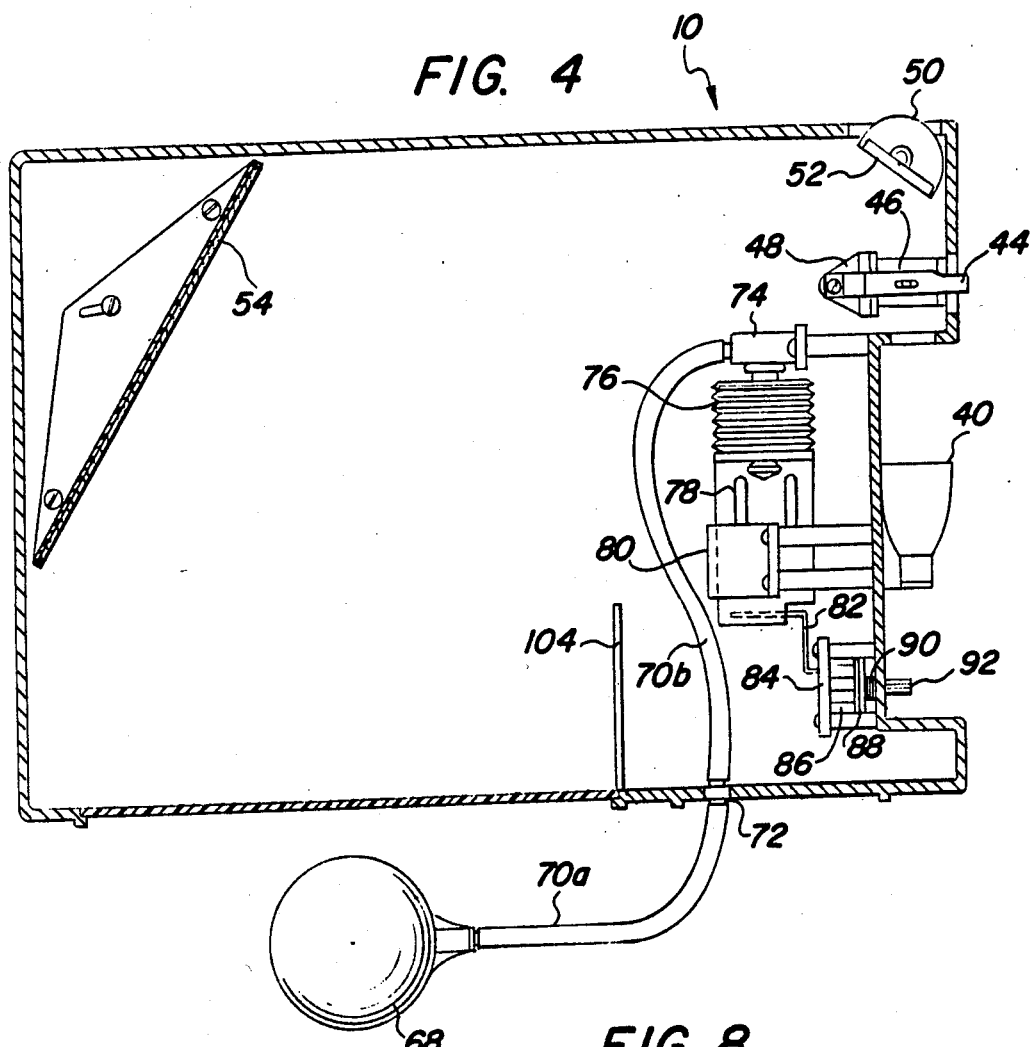
FIG. 4 is a sectional view taken about line 4—4 of FIG. 1.
Figure 7:
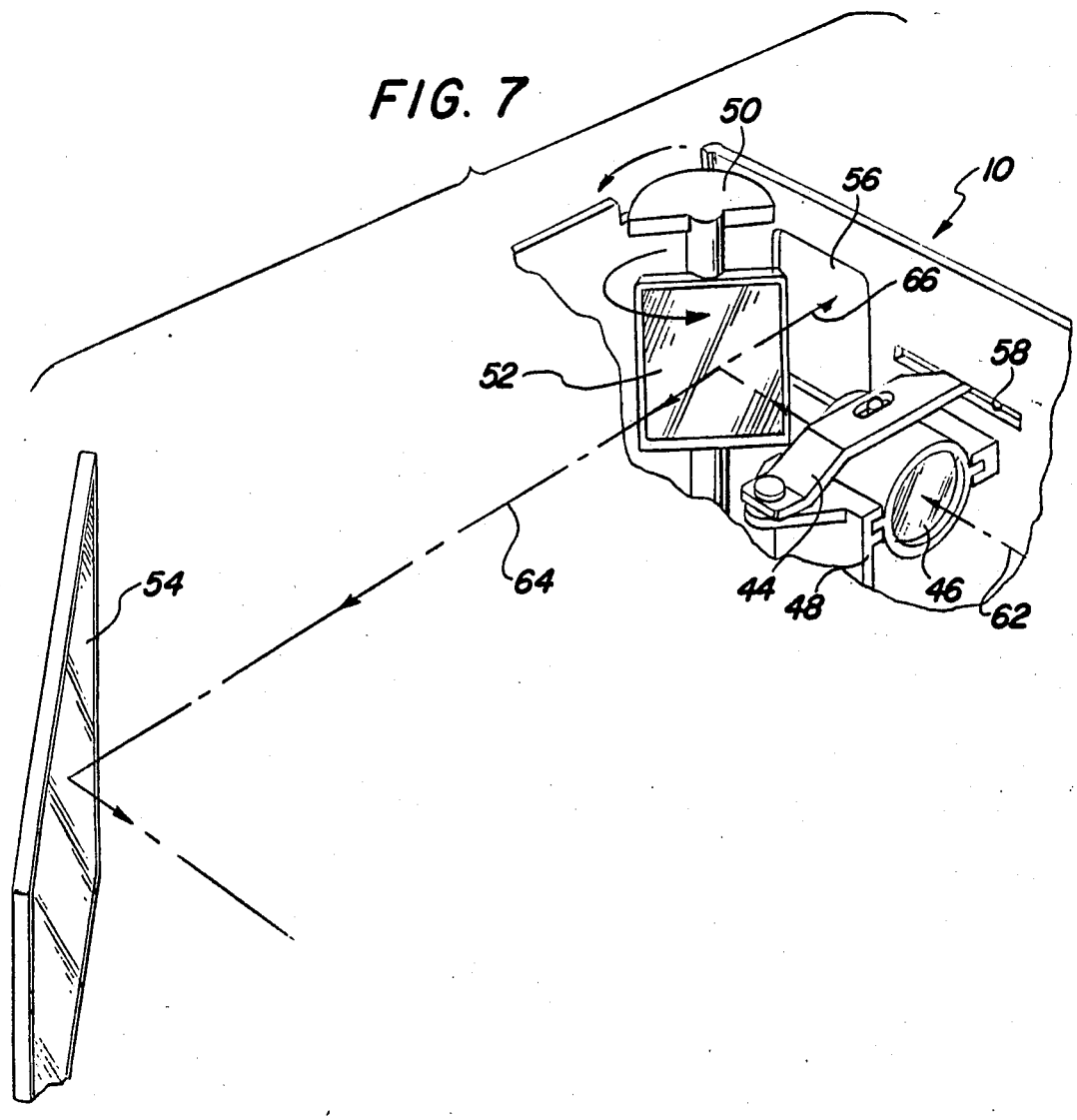
FIG. 7 is an enlarged, perspective view of the lens assembly and mirror assembly.

Upon the light bulb producing a light beam that passes out of the aperture 42a of the bulb housing 42, through the film aperture 36 and film element 28, and then the image aperture 38, the image produced passes into a lens assembly for focusing such image (FIGS. 4 and 7). The assembly includes a lens element 46 which is a generally tube shaped element that holds a lens of conventional design in the art which can focus images. A focus lever 44 is rotatably connected to the exterior surface of the lens element 46 and is a thin, elongated element having a semicircular shape at its middle portion to mate with the cylindrical shape of the lens element 46. At that semicircular shaped portion, the focus lever 44 rotates about a pin element fixed to the lens element 46 for rotation about an axis perpendicular to the optical axis 62. One end of the focus lever 44 extends through an elongated shaped focus aperture 58 formed in the right side facing of the housing assembly 10. The longitudinal axis of such aperture is generally parallel to the optical axis 62. The other end of the focus lever 44 is rotatably fixed to a lens mounting guide 48 which is, in turn, stationarily fixed within the housing assembly 10. Rotation of the focus lever 44 on the mounting guide 48 occurs about an axis generally parallel to the axis about which the focus lever 44 rotates with the lens element 46. The mounting guide 48 is preferably made of plastic and has a generally L-shaped configuration that serves to slidably support the focus lever 44 and lens element 46 as the user slides the focus lever 44 back and forth through the focus aperture 58. Concurrently, as the focus lever 44 moves through the focus aperture 58, the lens element 46 rotates with respect to the focus lever 44 and slides in the guide 48 so that the lens element 46 can maintain its longitudinal axis along the primary optical axis 62.

In so doing, the image projected will be focused and directed onto a rotatable mirror element 52 which is generally square shaped and made of a material found in conventional mirrors. It is rotatably fixed to the housing assembly 10 and rotated by a selector knob 50 which is a generally semicircular shaped, flat element with a rod shaped element extending perpendicular therefrom to the rotatable mirror element 52. The semicircular shaped portion of the selector knob 50 extends out of the back side facing of the housing assembly 10 to enable the user to rotate the selector knob 50 and thereby the rotatable mirror element 52.

By rotating the selector knob 50, the rotatable mirror element 52 can project the image from the lens element 62 either along a secondary optical axis 64 or a secondary optical axis 66 (FIG. 7). In the former situation, the image passes along such optical axis to impinge upon a fixed mirror element 54 which is also of a conventional mirror design having a rectangular shape and being of a size approximately equal to one of the left or right side facings of the housing assembly 10. The fixed mirror element 54 is stationarily fixed within the housing assembly 10 and positioned at the back corner of the housing assembly 10 opposite the selector knob 50 so that the fixed mirror element 54 and a portion of the left side facing and back facing of the housing assembly 10 form a generally triangle shaped configuration having a right angle formed at the intersection of the side and back facings.

When the selector knob 50 is rotated in the opposite direction, the rotatable mirror element 52 projects the image along the secondary optical axis 66 which enables the image to be projected through a viewing surface aperture 56 which is formed in the right side facing of the housing assembly 10 (FIG. 1). The viewing surface aperture 56 is generally square shaped and enables the images to be projected onto a viewing surface apart from the invention, such as a wall. This is in contrast to the images being projected onto the fixed mirror element 54, in which case, the images are thereby reflected onto a viewing screen 60 which is disposed in the front facing of the housing assembly 10. The viewing screen 10 is preferably made of a plastic material and is of a conventional design in the art to enable the user to view the projected images. The configuration of the viewing screen 60 is generally rectangular in shape with its shorter sides slightly smaller in length than the height of the front facing and its longer sides approximately equal to one-half of the length of the front facing.

To view the images either through the viewing screen 60 or on a viewing surface apart from the housing assembly 10, the film element 28 is moved within the second cartridge element 26 so that the individual images pass by the film aperture 36. This movement is accomplished by a pneumatic system operated by the user which drives a ratchet and clutch system connected to the photographic film assembly 24. The pneumatic system includes a hand pump 68 from which extends an air line 70a that leads to an air inlet 72 in the front facing of the housing assembly 10. The hand pump 68 is preferably bulb shaped to provide a cavity in which air can be maintained and is preferably made of a rubberized or soft plastic element. At the end of the bulb shaped configuration is an opening through which air can pass upon the user squeezing the hand pump 68. As air is expelled from the hand pump 68, the air travels through the air line 70a which is preferably made of a soft plastic material of a length sufficient to enable the user to hold the pump 68 while remaining in front of the viewing screen 60 at a distance for comfortable viewing (FIG. 4).

The end of the air line 70a opposite the hand pump 68 is engaged to the air inlet 72 which is stationarily fixed near the middle of the bottom edge of the front facing. The air inlet 72 is preferably made of a hard plastic element in a tube shaped configuration having an external circumference slightly smaller than the interior circumference of the air line 70a to enable the end of the air line 70a to be frictionally engaged to the air inlet 72.

Figure 5:
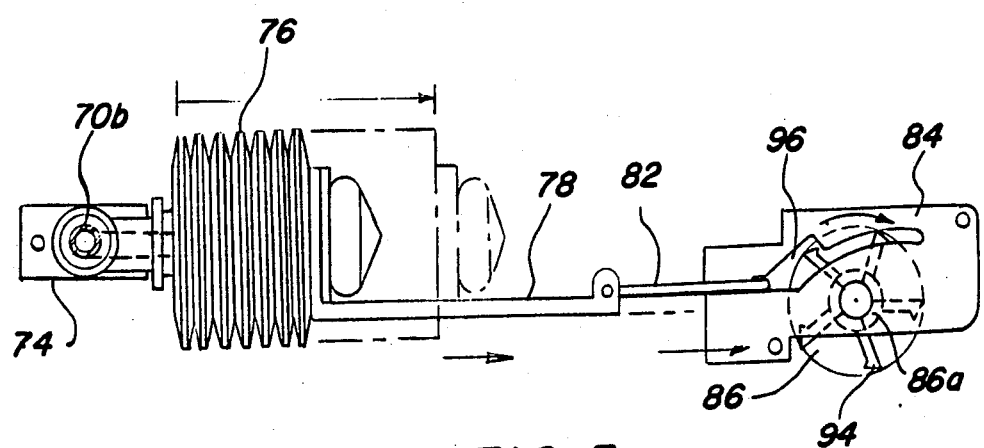
FIG. 5 is an enlarged, elevational side view of the bellow system and ratchet and clutch system.

On the portion of the air inlet 72 that extends into the interior of the housing assembly 10 is an air line 70b, similar in shape and material to that of air line 70a. The air line 70b extends from the air inlet 72 and leads to a bellow inlet element 74 which transmits the air from the air line 70b to a bellow element 76. In FIG. 5, the bellow inlet element 74 is a tube shaped element generally disposed in a right angle with one end thereof frictionally engaged within the end of the air line 70b opposite the air inlet 72. The other end of the bellow element 74 is frictionally engaged within an open end of the bellow element 76. The bellow element 76 is preferably made of a soft plastic material in a generally cylindrical shape with its sides being formed in an accordian-like configuration. One end of the bellow element 76 includes a tube shaped opening that engages the bellow inlet element 74 as described above. The opposite end of the bellow element 76 has an extension with a closed rounded end to engage a bellow slider element 78.

The bellow slider element 78 is preferably made of a metallic element in an L-shaped configuration, the shorter length of which has two extensions generally parallel to one another with their respective interior edges forming a U-shaped configuration to frictionally engage the rounded extension of the element 76. The longer side of the L-shaped configuration of the bellow slider element 78 is a flat, planar element that forms five elongated apertures and has one side thereof supported and slidably engaged into a bellow mounting guide 80 which is stationarily fixed to the housing assembly 10. The bellow mounting guide 80 includes two planar elements disposed at right angles to each other, one side being stationarily fixed to the housing assembly 10 and the other being positioned parallel and adjacent the planar element of the bellow slider element 78. That part of the bellow mounting guide 80 on which the bellow slider element 78 rests is configured on one side thereof to provide a channel though which one side of the bellow slider element 78 can slide in a direction along the longitudinal axis of the bellow element 76. The edge of the bellow slider element 78 opposite the edge held by the bellow mounting guide 80 is similarly slidably engaged in a channel formed by an interior portion of the housing assembly 10.

Figure 6:
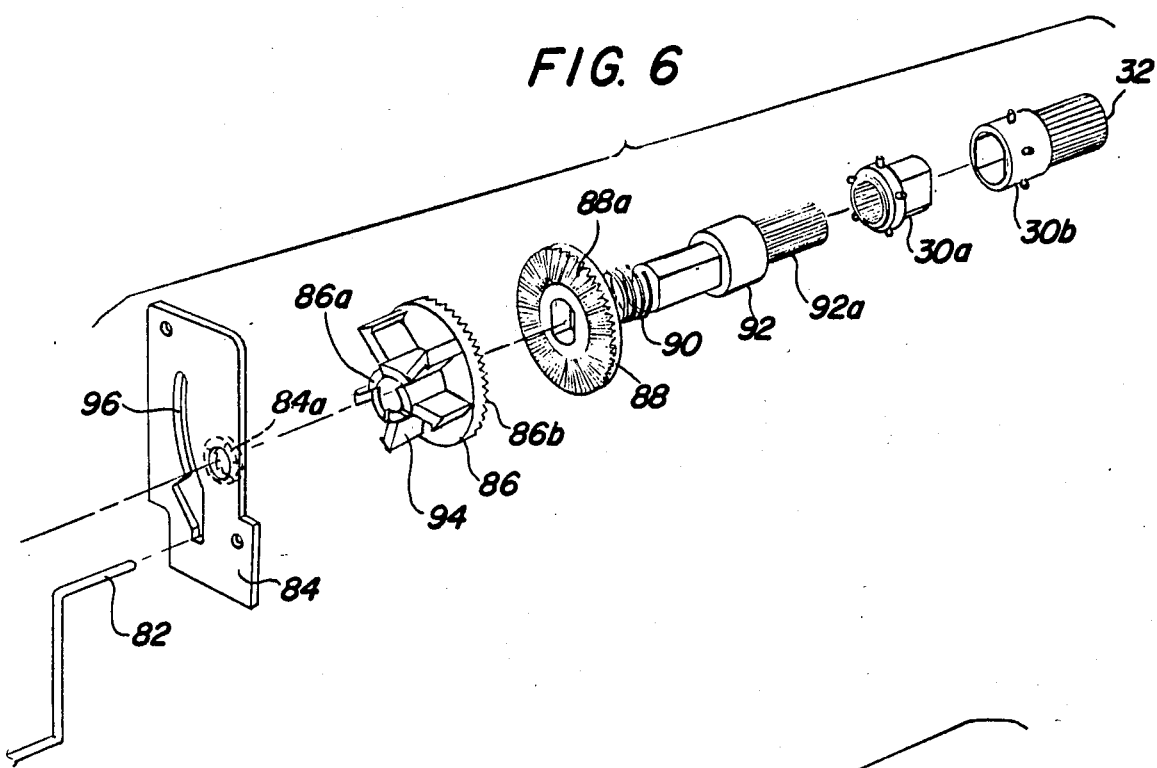
FIG. 6 is an enlarged, perspective view of the ratchet and clutch system while disassembled.

The end of the planar element of the bellow slider element 78 rotatably holds a bellow link element 82 which is a thin, rod shaped element in a Z-configuration having right angles therein. One end is held by the bellow slider element 78 to enable the bellow link element 82 to rotate about its longitudinal axis at the end thereof which is generally perpendicular to the longitudinal axis of the bellow element 76. The other end of the bellow link element 82 is slidably held within a guide aperture 96 of a clutch plate element 88 rigidly fixed in the housing assembly 10 (FIG. 5). The latter is preferably made of a hard, plastic material and is in a flat, rectangular shaped configuration whose two larger faces are positioned parallel to the right side facing of the housing assembly 10. The guide aperture 96 is arc shaped and extends over one-half of the larger faces of the mounting plate element 84 and whose imaginary point of center is above the top edge of the mounting plate element 84. On the larger face of the mounting plate element 84 which is immediately opposite the right side facing of the housing assembly 10 is a series of steps 84a that are rigidly fixed to the plate 84 and that extend out therefrom and towards the right side facing. Each step 84 is a generally ninety degree, triangular shaped element and positioned adjacent each other to form a circle, as in FIG. 6.

The steps 84a mate with a series of steps 86a of a ratchet wheel 86 for limiting the rotation of the ratchet wheel 88 in the clockwise direction only as viewed in FIG. 1. The ratchet wheel 88 is positioned intermediate the mounting plate element 84 and the right side facing of the housing assembly 10 (FIG. 6) and is a circular shaped element, preferably made of plastic and disposed so that its two sides are parallel to the larger faces of the mounting plate element 84. On the face of the ratchet wheel 86 immediately opposite the steps 84a are five impeller elements 94. Each impeller element 94 is preferably made of the same material as that of the ratchet wheel 86 and radiates equidistant to each other from the center of the ratchet wheel 86 to the circumferential edge thereof and terminates in flanged ends.

The steps 86a are stationarily fixed at the hub of the impeller elements 94 and configured like steps 84a. Located between the two adjacent impeller elements 94 is the end of the bellow link element 82 that extends through the guide aperture 96, as described above.

On the side of the ratchet wheel 86 opposite the impeller elements 94 are alternating teeth and grooves 86b that radiate from the point of center of the ratchet wheel 86 and out to the circumferential edge thereof. The teeth and grooves 86b are shaped and dimensioned to mesh with alternating teeth and grooves 88a of a clutch plate element 88 which is a wheel shaped element having a circumference equal to that of the ratchet wheel 86 and an aperture at its center. The side of the clutch plate 88 opposite its teeth and grooves 88a is generally smooth and contacts a helical shaped spring element 90 which is positioned intermediate the plate 88 and the right side facing of the housing assembly 10.

The spring element 90 is wrapped about the clutch shaft 92, mentioned above, the latter being a cylindrical shaped element having alternating teeth and grooves 92a about its external surface in a position parallel to the shaft's longitudinal axis. The teeth and grooves 92a are sized and configured to mesh into the teeth and grooves within the bore of the drive sprocket 30 disposed inside the film assembly 24. The end of the clutch shaft 92 adjacent the clutch plate 88 is configured to be received in the aperture of the clutch plate 88 and rotates as the plate 88 is rotated in the fashion described below.

In operation, the user can select one of a number of photographic film assemblies 24 for viewing. Each film assembly 24 will contain a film element 28 whose images describe stories that are different from each other. The photographic film assembly 24 chosen is engaged to the housing assembly 10 by frictionally engaging the secondary cartridge element 26 to the three holder elements 106 while sliding the drive sprocket 30 over the clutch shaft 92. With the power source 12 being "on," the light bulb (not shown) inside the reflector element 40 produces a light beam whose optical axis is positioned generally along the primary optical axis 62. The light beam extends out of the aperture in the bulb housing 42 and passes into the particular image on the film element 28 immediately adjacent the film aperture 36. The image on the film element 28 will then be projected along the primary optical axis 62 and into the lens element 46.

The user then decides whether viewing is to occur on the viewing screen 60 or on a viewing surface apart from the toy. The selection is made by rotating the selector knob 50. Turning the knob 50 in one direction will direct the image along the secondary optical axis 64 for reflection off the fixed mirror element 54 and onto the viewing screen 60. Rotating the selector knob 50 in the opposite direction will direct the image along the secondary optical axis 66 and out through the viewing surface aperture 56. In either event, by viewing the projected image, the user can determine whether the image is in focus. If the image is not in focus, the user can focus the image by sliding the focus lever 44 through the focus aperture 58 which rotates the focus lever 44 about the lens mounting guide 48 and moves the lens element 46 along the optical axis 62 for focusing.

If the image projected is not then of only a single image but rather an image of two adjacent images on the film element 28, the user can rotate the sprocket knob 32 on the film assembly 24 in the clockwise direction as viewed in FIG. 1 to adjust the picture to a single image. Further, the sprocket knob 32 can be rotated in the clockwise direction to move the first image in sequence to the film aperture 36 so that viewing occurs from the beginning of the story.

To begin the audio transmission that accompanies the projected images, the user selects the appropriate tape element 16 within the first cartridge element 18 that complements the tape assembly 24 chosen and inserts the element 18 through the tape cartridge inlet 14 until it becomes engaged in the magnetic deck assembly 20. As the audio transmission begins, the user can adjust the volume of such transmission by rotating the volume knob 98. As the audio transmission continues, the transmission will signal to the user when the next image in the film assembly 24 should be viewed. Upon receiving such a signal, the user squeezes the hand pump 68 to expel the air therein and into air line 70a, the air inlet 72, and the air line 70b. Thereafter, the air passes through the bellow inlet element 74 and into the bellow element 76. Because the end of the bellow element 76 opposite the bellow inlet element 74 is closed, the air causes an expansion of the bellow element 76 and thereby moves the slider element 78 through the mounting guide 80. The bellow link element 82 attached to the slider element 78 will thus move through the guide aperture 96 and contact one impeller element 94 near its end. Upon such contact, the impeller element 94 will move in a clockwise direction as viewed in FIG. 6 and cause the ratchet wheel 86 to rotate in the same direction. The clutch plate 88 remains engaged to the ratchet wheel 86 by both of their teeth and grooves and the force imparted by the spring element 90. Consequently, rotation of the ratchet wheel 88 is imparted to the clutch plate 88 which, in turn, causes the clutch shaft 92 to similarly rotate and thus the drive sprocket 30 within the film assembly 24.

Upon the rotation of the drive sprocket 30, the teeth on the drive sprocket 30 which are engaged to the film element 28 causes the film element 28 to travel in a looped path in the second cartridge element 26 only a distance sufficient to move the next image in sequence in front of the film aperture 36 for projection.

Following each activation of the hand pump 68 and consequent rotation of the ratchet wheel 86, the bellow link element 82 begins to move back through the guide aperture 96 to its position prior to activation of the pump 68. The return of the link element 82 is caused by the bellow element 76 contracting back to its initial position. However, the ratchet wheel 86 maintains the position it took following activation of the pump 68 because the meshing of steps 86a and 84a only allow the ratchet wheel 86 to rotate in the clockwise direction. Consequently, as the link element 82 returns to its initial position, it is pulled back across the end of the impeller element 106 it rotated and rotates in the slider element 78 without moving the ratchet wheel 86 in the counterclockwise direction.

As the audio transmission continues, signals will continually be given to the user to advance the film element 28 to the next image. Upon each signal, the user will squeeze the hand pump 68 to activate the pneumatic system and the ratchet and clutch system to advance the film element 28. Upon completion of the audio transmission and viewing of the images, the user can depress the ejection element 102 to remove the magnetic tape assembly from the deck assembly 20. A new film assembly 24 can then be inserted as well as a new magnetic tape assembly.

If the user so desires, a film assembly 24 can be viewed without an audio transmission and/or at any rate selected by the user. Similarly, an audio transmission can be heard merely by inserting a magnetic tape assembly into the deck assembly 20 without a film assembly 24.

It should be understood, of course, that the foregoing relates to a preferred embodiment of the invention and that modifications may be made without departing from the spirit and scope of the invention as set forth in the following claims, wherein:

I claim:

1. An improved audio-visual toy that produces an audio transmission that describes a story concurrently with a series of visual images that also describe the story and are projected either through a viewing screen in a housing assembly of the toy or onto a viewing surface apart from the toy, the improvement comprising:

a power source;

a light source disposed on an external portion of the housing assembly and powered by the power source;

means for producing an audio transmission substantially free of impairment due to vibration or movement of the toy, including a magnetic tape assembly having a magnetic tape element that contains a plurality of signals that describe the story and is housed and moveable inside a first cartridge element, and a means for reading and transmitting the signals, including a magnetic deck assembly fixed within the upper portion of the housing assembly adjacent that part of its top side which forms an aperture for receiving the tape assembly, the deck assembly being powered by the power source;

means for projecting a sequence of visual images for uninterrupted viewing by the user throughout the time the toy is in use, including a photographic film assembly having a photographic film element containing a plurality of individual images which when viewed in sequence describe the story and through which the light source can project a light beam, and a second cartridge element for housing the film assembly, the film assembly being readily engaged into and disengaged from its operative position on an external portion of the housing assembly, a lens assembly rotatably fixed to and within the housing assembly and in optical communication with the images projected from the light beam for focusing the image, and a mirror assembly having two mirror elements disposed within the housing assembly for optically communicating with the visual images passing through the lens assembly and switching the projection of the images between the viewing screen and viewing surface; and means for enabling the user to activate the movement of the film element within the second cartridge element at a rate selected by the user, which activation and selection are capable of being made while the user remains beyond the user's reach of such elements, including a pneumatic system having a hand pump and an air line outside the housing assembly for sending compressed air into a bellow system assembly stationarily fixed in the housing assembly and having a bellow inlet element, a bellow element, a bellow mounting guide, a bellow slider element, and a bellow link element, the bellow assembly activating a ratchet and clutch system for moving the film element, the ratchet and clutch system having a ratchet wheel, a clutch plate element, a spring element, and a clutch shaft.

2. The invention of claim 1 wherein the film element is disposed in a looped path in the second cartridge element and capable of moving continuously through the path.

3. The invention of claim 2 wherein the enabling means enables the user to move the film element a predetermined distance through the looped path so that only a single image is viewed each time the enabling means is activated.

4. The invention of claim 3 wherein the bellow system assembly rotates the ratchet wheel a predetermined number of degrees about the wheel's axis of rotation each time the enabling means is activiated.

5. The invention of claim 4 wherein the ratchet and clutch system moves the film element in only one direction around the looped path.

6. An improved audio-visual toy that produces an audio transmission that describes a story concurrently with a sequence of visual images projected either through a viewing screen in a housing assembly of the toy or onto a viewing surface apart from the toy, the improvement comprising:

a power source;

a light source stationarily fixed on an external side facing portion of the housing assembly and powered by the power source;

a magnetic tape assembly having a magnetic tape element containing a plurality of signals that compliment the sequential visual images projected and story thereby produced and that indicate to the user when the next image in sequence should optimally be viewed, the tape element being housed and moveable inside a first cartridge element;

a magnetic deck assembly powered by the power source and stationarily fixed inside the upper portion of the housing assembly for reading the signals on the magnetic tape element upon insertion of the magnetic tape assembly therein;

a photographic film assembly having a photographic film element through which the light source projects a light beam, the film element containing a plurality of individual images which describe the story when the images are viewed in sequence and being housed in a second cartridge element and moveable through a looped path therein to allow the film element to continuously repeat the sequence of visual images, the cartridge element being readily engaged and disengaged from its operative position on an external portion of the housing assembly adjacent the light source;

a lens assembly rotatably fixed to and within the housing assembly and remaining in optical communication with the images projected from the light source for focusing the projected images, the assembly having a lens element moveable along the optical axes of the projected images;

a mirror assembly disposed within the housing assembly and remaining in optical communication with the projected images upon their passing through the lens assembly for switching the projection of the images between the viewing screen and the viewing surface, the assembly having a fixed mirror element in optical communication with a rotatable mirror element adjacent the lens assembly; and means for enabling the user to remotely activate the movement of the film element within the second cartridge element at a rate indicated by a plurality of signals on the magnetic tape element or at any other rate selected by the user, the activation and selection capable of being made while the user remains beyond the user's reach of such elements, the enabling means including a pneumatic system having a hand pump outside the housing assembly and connected to an air line that leads into the the housing assembly, the air line being of a length sufficient to allow the user to hold the pump and remain beyond the user's reach of the housing assembly, a bellow inlet element at the end of the air line inside the housing assembly, a bellow element connected to the inlet and fixed to a bellow slider element, a bellow mounting guide to support the slider element which acts on a bellow link element, a clutch mounting plate element in which the link element is guided, and a ratchet and clutch system having a ratchet wheel in communication with the link element, a clutch plate element engaged to the ratchet wheel, a spring element adjacent the clutch plate, and a clutch shaft from the clutch plate to the photographic film assembly.

7. The invention of claim 6 wherein the enabling means moves the film element only in one direction through the looped path.

8. The invention of claim 7 wherein the hand pump includes a chamber that is capable of expelling a volume of air not more than that which is sufficient to cause the ratchet and clutch system to move the film element for projection of only the next image in sequence.

9. The invention of claim 7 wherein the film assembly further comprises a drive sprocket element engaged to the clutch shaft and a sprocket knob element for manually moving the film element in the looped path without the use of the enabling means.

* * * * *